(12) United States Patent
Alemu

(10) Patent No.: US 9,154,009 B2
(45) Date of Patent: Oct. 6, 2015

(54) BRUSHLESS MOTOR CONTINUATION CONTROL IN A POWER TOOL

(71) Applicant: Black & Decker Inc., Newark, DE (US)

(72) Inventor: Redeat G. Alemu, Timonium, MD (US)

(73) Assignee: Black & Decker Inc., Newark, DE (US)

( * ) Notice: Subject to any disclaimer, the term of this patent is extended or adjusted under 35 U.S.C. 154(b) by 160 days.

(21) Appl. No.: 13/919,477

(22) Filed: Jun. 17, 2013

(65) Prior Publication Data

US 2013/0342144 A1     Dec. 26, 2013

Related U.S. Application Data

(60) Provisional application No. 61/660,335, filed on Jun. 15, 2012.

(51) Int. Cl.
| | |
|---|---|
| *H02K 3/34* | (2006.01) |
| *H02P 27/08* | (2006.01) |
| *H02P 29/00* | (2006.01) |
| *H02P 6/12* | (2006.01) |
| *H02K 7/14* | (2006.01) |
| *H02P 6/14* | (2006.01) |
| *B25F 5/00* | (2006.01) |

(52) U.S. Cl.
CPC .. *H02K 3/34* (2013.01); *B25F 5/00* (2013.01); *H02K 7/145* (2013.01); *H02P 6/12* (2013.01); *H02P 6/14* (2013.01); *H02P 27/08* (2013.01); *H02P 29/0088* (2013.01)

(58) Field of Classification Search
CPC ..... H02J 7/0021; H02J 7/0026; H02P 7/0044; H02P 27/08; H02P 6/12; H02P 6/14; B25J 7/145

USPC ...................................................... 318/400.28
See application file for complete search history.

(56) References Cited

U.S. PATENT DOCUMENTS

| | | | |
|---|---|---|---|
| 6,781,853 B2 | 8/2004 | Xu et al. | |
| 6,906,485 B2 | 6/2005 | Hussein | |
| 6,997,684 B2 | 2/2006 | Hahn et al. | |
| 2011/0305043 A1 | 12/2011 | Matsumoto | |
| 2011/0316914 A1 | 12/2011 | Knierim | |
| 2012/0293103 A1* | 11/2012 | Forster et al. | 318/503 |
| 2013/0269961 A1* | 10/2013 | Lim et al. | 173/1 |
| 2014/0368139 A1* | 12/2014 | Zhou et al. | 318/400.13 |

FOREIGN PATENT DOCUMENTS

JP     2005168136     6/2005

* cited by examiner

*Primary Examiner* — Karen Masih
(74) *Attorney, Agent, or Firm* — Amir R. Rohani; Scott Markow

(57) ABSTRACT

A control unit for controlling commutation of a brushless direct current (BLDC) motor provided. The control unit controls high-side and low-side switches arranged between a power source and the motor and configured as a three-phase bridge to commutate the motor. The control unit is configured to provide drive signals to drive each of the high-side and low-side switches to control, for each phase of the bridge, a pulse-width modulation (PWM) of one of the high-side or low-side switches. For each phase of the bridge, immediately following a first cycle ending with a falling edge of the drive signal for one of the high-side or low-side switches, the control unit introduces a special commutation edge pulse in the drive signal of the other of the high-side or low-side switches to shunt the current from the motor before turning both the high-side and the low-side switches off during a second cycle.

19 Claims, 6 Drawing Sheets

BRUSHLESS MOTOR CONTINUATION CONTROL IN A POWER TOOL

CROSS-REFERENCE TO RELATED APPLICATIONS

This application claims the benefit of prior filed U.S. Provisional Application No. 61/660,335, filed Jun. 15, 2012, content of which is incorporated herein by reference in its entirety.

FIELD OF THE INVENTION

This disclosure relates to a power tool, and more particularly to commutation control an electric brushless DC motor for a power tool.

BACKGROUND

The use of cordless power tools has increased dramatically in recent years. Cordless power tools provide the ease of a power assisted tool with the convenience of cordless operation. Conventionally, cordless tools have been driven by Permanent Magnet (PM) brushed motors that receive DC power from a battery assembly or converted AC power. The motor associated with a cordless tool has a direct impact on many of the operating characteristics of the tool, such as output torque, time duration of operation between charges and durability of the tool. The torque output relates to the capability of the power tool to operate under greater loads without stalling. The time duration of the power tool operation is strongly affected by the energy efficiency of the motor. Since, during some operating modes cordless tools are powered by battery modules that contain a limited amount of energy, the greater the energy efficiency of the motor, the longer the time duration that the tool can be operated. The durability of a power tool is affected by many factors, including the type of motor that is used to convert electrical power into mechanical power.

Brushed motors such as the PM brushed motors that are generally employed in power tool applications are susceptible to damaged brushes over time. The main mechanical characteristic that separates Permanent Magnet brushless motors from Permanent Magnet brushed motors is the method of commutation. In a PM brushed motor, commutation is achieved mechanically via a commutator and a brush system. Whereas, in a brushless DC motor, commutation is achieved electronically by controlling the flow of current to the stator windings. A brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator core includes field windings around the rotor. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings. A set of sense magnets coupled to the PMs in the rotor assembly are sensed by a sensor, such as a Hall Effect sensor, to identify the current position of the rotor assembly. Proper timing of the commutation sequence is maintained by monitoring sensors mounted on the rotor shaft or detecting magnetic field peaks or nulls associated with the PM.

The power components, i.e., MOSFETs, generally generate a significant amount of heat due to considerable power dissipation. For this reason, the power components are typically mounted in close proximity to a heat sink constructed to carry heat away from the power components. Heat generation is particularly problematic in high power/high speed power tools. What is needed is an effective way of reducing the amount of power dissipation and heat generated by the power components.

SUMMARY

According to an embodiment of the invention, a power tool is provided. The power tool may be, for example, a drill or an impact driver, although other types of power tools may also be used. The power tool includes a housing and a brushless direct current (BLDC) motor housed inside the housing. The motor includes a stator assembly and a rotor pivotably arranged inside the stator. The power tool also includes high-side and low-side switches arranged between a power source and the motor and configured as a three-phase bridge to commutate the motor, each phase of the bridge being connected to a corresponding phase of the stator.

In an embodiment, a control unit is provided within the power tool. The control unit is configured to provide drive signals to drive each of the high-side and low-side switches to control, for each phase of the bridge, a pulse-width modulation (PWM) of one of the high-side or low-side switches. For each phase of the bridge, immediately following a first cycle ending with a falling edge of the drive signal for one of the high-side or low-side switches, the control unit introduces a special commutation edge pulse in the drive signal of the other of the high-side or low-side switches to shunt the current from the motor before turning both the high-side and the low-side switches off during a second cycle.

In an embodiment, for each phase of the bridge, the control unit is configured to control the PWM of the high-side switch and synchronous rectification of the low-side switch during the first cycle. In an embodiment, the control unit is configured to introduce the special commutation edge pulse in the drive signal for the low-side switch during the second cycle.

In an embodiment, for each phase of the bridge, the control unit is configured to keep the high-side switch OFF and the low-side switch ON during the first cycle. In an embodiment, the control unit is configured to introduce the special commutation edge pulse in the drive signal for the high-side switch during the second cycle.

In an embodiment, the control unit is configured to determine a width of the special commutation edge pulse as a function of either a peak current or a resistance and inductance of the current flow path.

According to an aspect of this disclosure, a method of controlling a commutation of a brushless direct current (BLDC) motor via a plurality of high-side and low-side switches arranged between a power source and the motor and configured as a three-phase bridge is provided. In an embodiment, the method includes: providing drive signals to drive each of the high-side and low-side switches to control a pulse-width modulation (PWM) of one of the high-side or low-side switches for each phase of the bridge; and immediately following a first cycle ending with a falling edge of the drive signal for one of the high-side or low-side switches within each phase of the bridge, introducing a special commutation edge pulse in the drive signal of the other of the high-side or low-side switches to shunt the current from the motor before turning both the high-side and the low-side switches off during a second cycle.

According to another aspect of this disclosure, a power tool is provided including a housing and a brushless direct current (BLDC) motor housed inside the housing, the motor including a stator and a rotor pivotably arranged inside the stator. In an embodiment, high-side and low-side switches are arranged between a power source and the motor and configured as a three-phase bridge to commutate the motor, each phase of the bridge being connected to a corresponding phase of the stator. In an embodiment, a control unit is provided and configured to provide drive signals to drive each of the high-side and low-side switches to control, for at least one phase of the bridge, a pulse-width modulation (PWM) cycle of the high-side switch followed by a continuous ON cycle of the low-side switch during a first full cycle, and a continuous ON cycle of the high-side switch followed by a PWM cycle of the low-side switch during a second full cycle.

In an embodiment, the control unit is configured to control a synchronous rectification of the low-side switch during the PWM cycle of the high-side switch, and control a synchronous rectification of the high-side switch during the PWM cycle of the low-side switch. In an embodiment, the PWM cycle of the high-side switch during the first full cycle has the same width as the continuous ON cycle of the high-side switch during the second full cycle. In an embodiment, for a second phase of the bridge, the controller is configured to control a PWM cycle of the high-side switch during the second full cycle in two separate cycles with a continuous ON-cycle of the high-side switch in between. In an embodiment, the controller is configured to control a continuous-ON cycle of the low-side switch during the first full cycle, but not during the second full-cycle.

BRIEF DESCRIPTION OF THE DRAWINGS

The drawings described herein are for illustration purposes only and are not intended to limit the scope of this disclosure in any way.

DESCRIPTION

Figure 1:
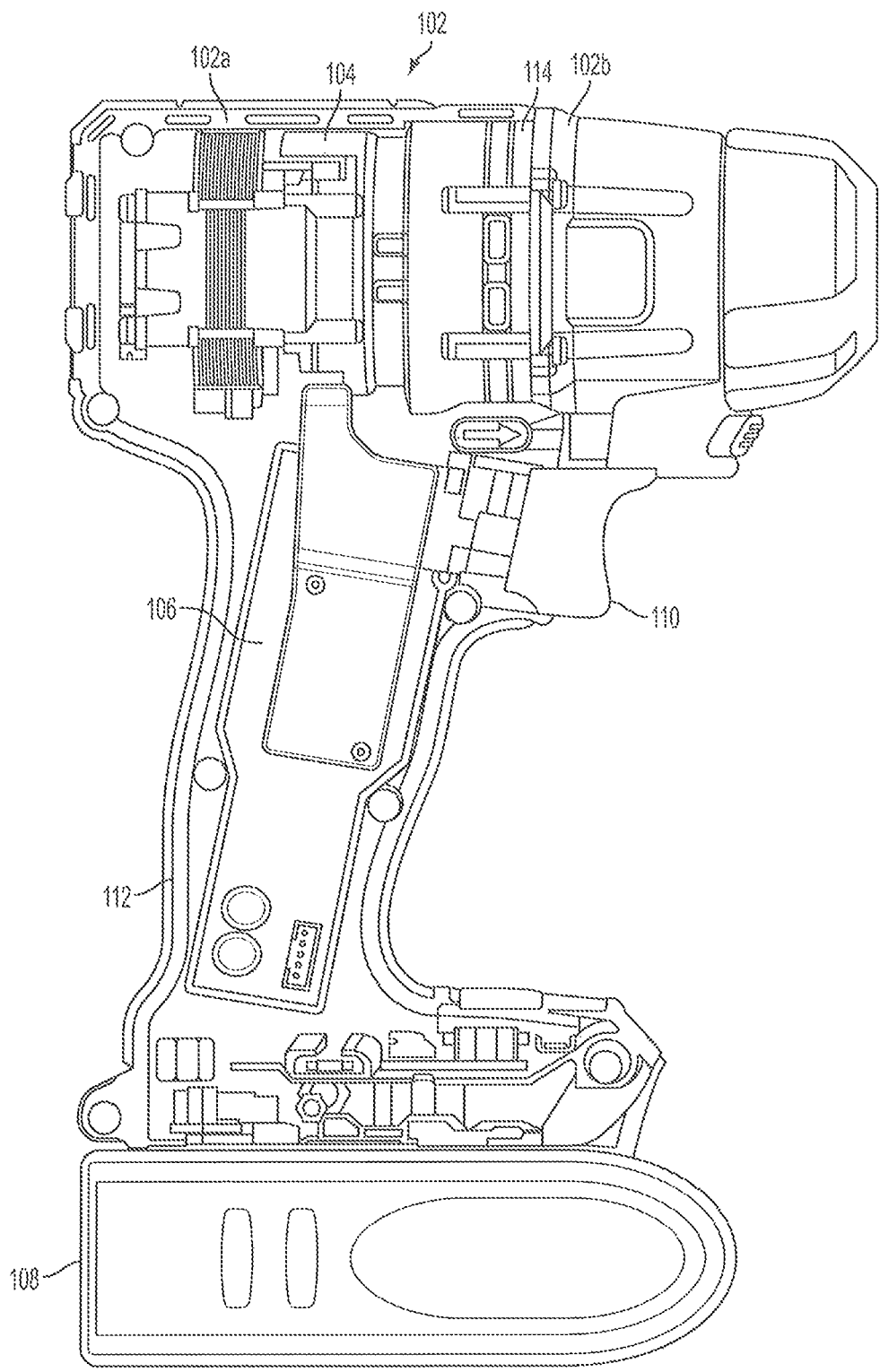
FIG. 1 depicts a perspective cross-sectional view of a power tool, according to an embodiment of this disclosure.

With reference to the FIG. 1, a power tool 100 constructed in accordance with the teachings of the present disclosure is illustrated in a longitudinal cross-section view. The power tool 100 in the particular example provided may be a drill/driver, but it will be appreciated that the teachings of this disclosure is merely exemplary and the power tool of this invention could be a circular saw, a reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a housing assembly 102, a motor assembly 104, a control module 104, a battery pack 108, an input unit (e.g., a variable speed trigger) 110, a transmission assembly 114, an output spindle (not shown), and a chuck (not shown) that can be coupled for rotation with the output spindle. The housing assembly 102 can include a housing 102a and a gear case 102b that can be removably coupled to the housing 102a. The housing 102a can define a housing body and a handle 112.

According to an embodiment, the motor 104 is received in the housing 102a. The motor can be any type of motor and may be powered by an appropriate power source (electricity, pneumatic power, hydraulic power). In the particular example provided, the motor is a brushless DC electric motor and is powered by a battery pack 108. An input unit 110 is mounted in the handle 112 below the housing 102a. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110, supplies the drive signals to the motor. In the exemplary embodiment of the invention, the control unit 106 is provided in the handle 112.

Construction details of the brushless motor 104 or the control unit 106 are beyond the scope of this disclosure, and can be found in co-pending International Patent Publication No. WO/2011159674 by the same assignee as this application, which is incorporated herein by reference in its entirety. The brushless motor 104 depicted in FIG. 1 is commutated electronically by the control unit 106. The tool 100 is powered by a suitable power source such as the battery pack 108. It is envisioned, however, that the present disclosures can be applied to a power tool with an AC power source, which may further include an AC-to-DC converter to power to motor. Using the variable-speed input and other inputs from the input unit 110, the control unit 106 controls the amount of power supplied to the motor 104. In an exemplary embodiment, the control unit 106 controls the Pulse Width Modulation (PWM) duty cycle of the DC power supplied to the motor 104. The control unit 106, in an embodiment, includes a micro-controller or other programmable processing unit to control supply of DC power to the motor 104 and electrically commutate the motor 104.

Figure 2:
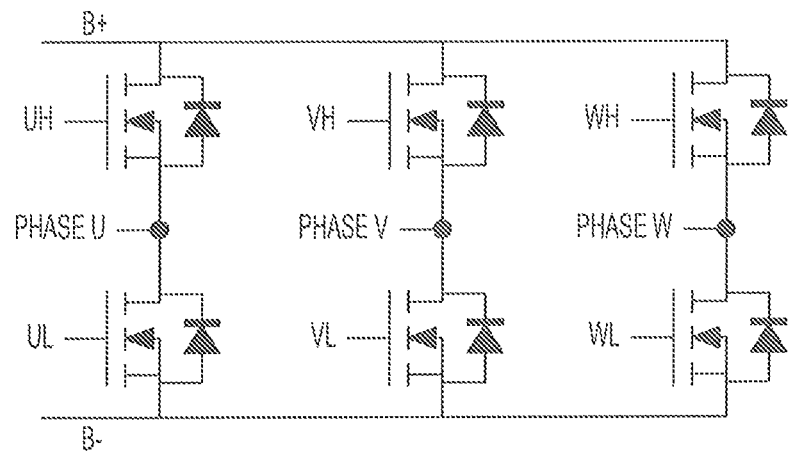
FIG. 2 depicts a simplified circuit diagram of a three-phase inverter bridge and the corresponding PWM control signals to generate a six step commutated three phase voltage for BLDC motor control.

FIG. 2 depicts a simplified circuit diagram of a three-phase inverter bridge and the corresponding PWM control signals to generate a six step commutated three phase voltage for BLDC motor control. This circuit may be provided as a part of the control unit 106. As shown in this figure, the circuit includes three high-side switches and three low-side switches. The switches may be, for example, Field Effect Transistors (FETs), in an embodiment. The gates of the FETs may be controlled by the micro-controller. The PHASE U, PHASE V, and PHASE W signals are provided to the terminals of the three-phase brushless motor 104.

Figure 3:
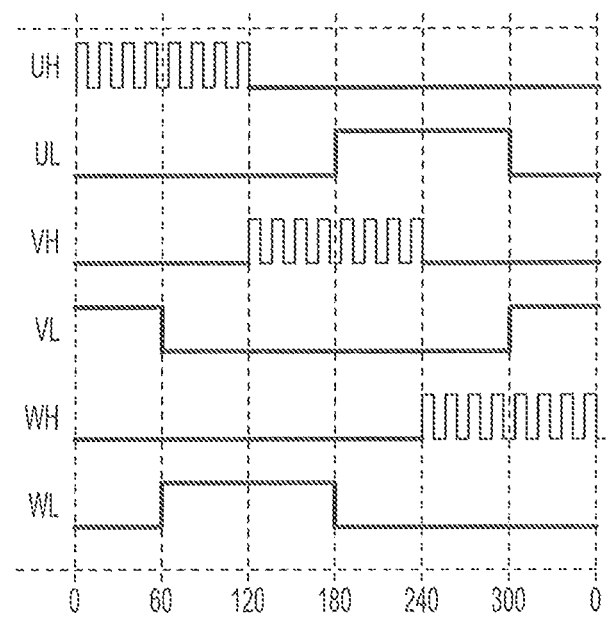
FIG. 3 depicts a waveform diagram of a conventional commutation control mechanism of the three-phase inventor bridge of FIG. 2.

FIG. 3 depicts a waveform diagram of a conventional control mechanism of the three-phase inventor bridge of FIG. 2. As shown in this figure, high-side FETs are used for Pulse Width Modulation (PWM) for motor speed control. During the PWM cycle of the high-side FETs, the corresponding low-side FETs are kept low. The issue with this conventional control mechanism is the amount of power loss in the FETs. The power losses are explained in detail below with respect to the U phase FETs. The U phase FETs are used as an example, but it must be understood that the FETs in the other two phases experience similar power losses.

From 0 to 120 degrees: The high side FET is subject to conduction loss and switching loss. The conduction loss is a function of the duty cycle of the PWM control and the ON resistance of the FET. The switching loss is a function of the PWM frequency. Meanwhile, the low side FET itself will have zero power loss as it was OFF during this period. However, the low side diode associated with the low side FET will dissipate power. This power loss is a function of the duty cycle of the PWM control and the PWM frequency.

From 120 to 180 degrees: Both the high and low side FETs are turned OFF. However, as found by the inventors, there is significant power loss on the diode of the low side FET at the very beginning of this period, because the motor winding current decays from its high value down to zero through the low side diode.

From 180 to 300 degree: The high side FET and the diode do not have considerable power loss contribution, but the low side FET is continuously conducting in order to provide a return path for the current from the V (between 180 to 240 degrees) and U (between 240 to 300 degrees) high-side FETs. The low-side FET is thus subject to conduction loss that is a function of its ON resistance.

From 300 to 360 degree: Both the high and low side FETs are turned OFF in this sector. However, there is significant power loss on the beginning of the cycle as the current of the motor winding decays back to zero through the high side diode.

Since power MOSFETs have typically very low ON resistance (i.e., drain to source voltage) compared to ON resistance (i.e., the forward voltage drop) of a diode, the power loss associated with a FET for equal amount of current flow is very low in comparison. Thus, according to an embodiment of the invention disclosed herein, a special commutation edge pulse is introduced to turn on the FETs briefly in order to shunt the motor current through the FETs instead of the associated diodes. This helps reduce the power dissipation associated with the FETs in the circuit diagram of FIG. 2.

Figure 4:
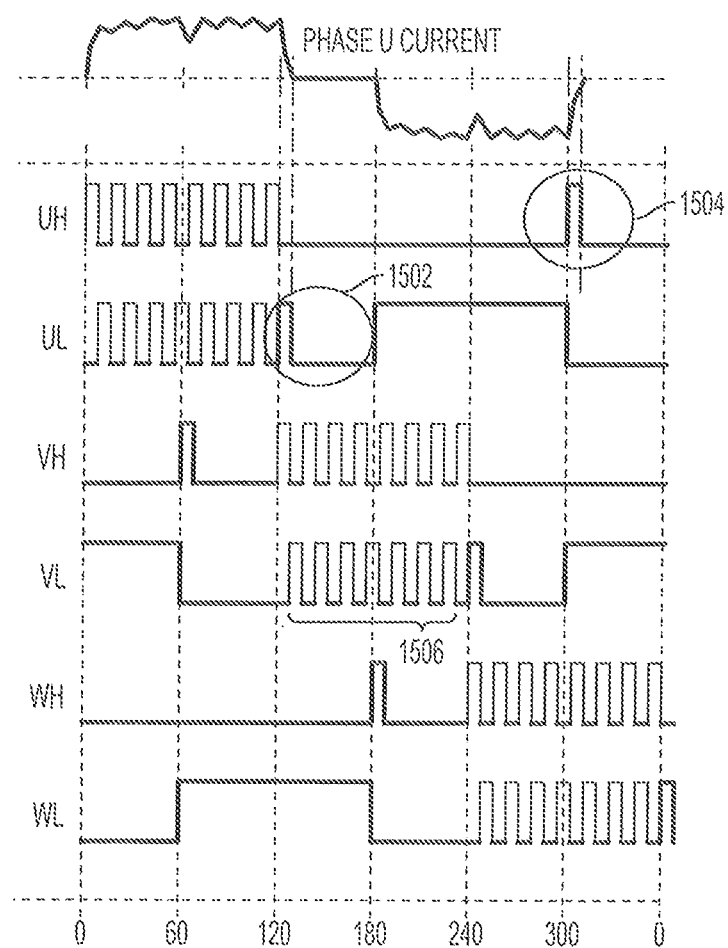
FIG. 4 depicts a waveform diagram of a motor commutation control mechanism according to an embodiment of this disclosure.

According to an embodiment of the invention with reference to the waveform diagram of FIG. 4, a control method and technique is provided. In this diagram, the FETs are controlled more efficiently so as to minimize the power losses on the overall system in two ways. First, according to an embodiment, during the PWM cycles of the high-side FETs, the low-side FETs are controlled with synchronous rectification. As the high-side FET is being toggled high and low during the PWM cycle, the low-side FET is oppositely toggled low and high during the same cycle. Second, according to an embodiment, the special commutation edge pulse is introduced during cycles where both the high-side and low-side FETs are OFF. These improvements are discussed below in further detail, once again with respect to the U phase as an example, according to an embodiment of the invention.

From 0 to 120 degrees: As discussed above, the high side FET is subject to conduction loss that is a function of the duty cycle of the PWM. The high-side FET is also subject to switching loss that is a function of the PWM frequency. At the same time, in an embodiment, the low-side FET is switched with synchronous rectification, allowing the OFF cycle current to flow through the low-side FET rather than the low-side diode. The FET has less voltage drop than the diode and thus results in less power loss.

From 120 to 180 degrees: At the beginning of this period, a special commutation edge pulse 1502 is introduced for a brief moment in the low-side FET following the last low cycle of the PWM cycle, according to an embodiment. The motor winding current in this embodiment is shunted by the special commutation edge pulse 1502, turning the low side FET ON for a brief cycle. Absent the edge pulse, this current would flow through the low side diode, which would result in higher power dissipation. In an embodiment, the width of the edge pulse 1502 may be pre-programmed in software, or it may be dynamically calculated via the control unit as a function of the peak current or the resistance and inductance of the flow path. The width of the edge pulse 1502 may alternatively be implemented in a look-up table used by the control unit.

From 180 to 300 degree: During the low-side FET ON cycle, the high-side FET and diode will not have any power loss contribution. The low-side FET is subject to conduction loss.

From 300 to 360 degree: At the beginning of this period, the motor winding current is shunted by a second special commutation pulse 1504, turning the high-side FET ON for a brief cycle. Absent the edge pulse 104, the motor current would flow through the high side diode, resulting in higher power dissipation. The width of the pulse is once again either calculated or tabulated by the control unit based on the peak current, the resistance and the inductance of the current path.

It was found by the inventors that the reduction of the total power loss resulting from passing the current through the low-side and high-side FETs rather than the associated diodes during the special commutation edge pulses 1502 and 1504 results in significant improvement in efficiency of the inverter bridge system. Furthermore, implementing the technique disclosed herein in a power tool, it was found that tool temperature could be reduced by 20% compared to a power tool having the conventional three-phase inverter bridge of FIG. 2. This technique thus improves the overall tool performance.

Figure 5:
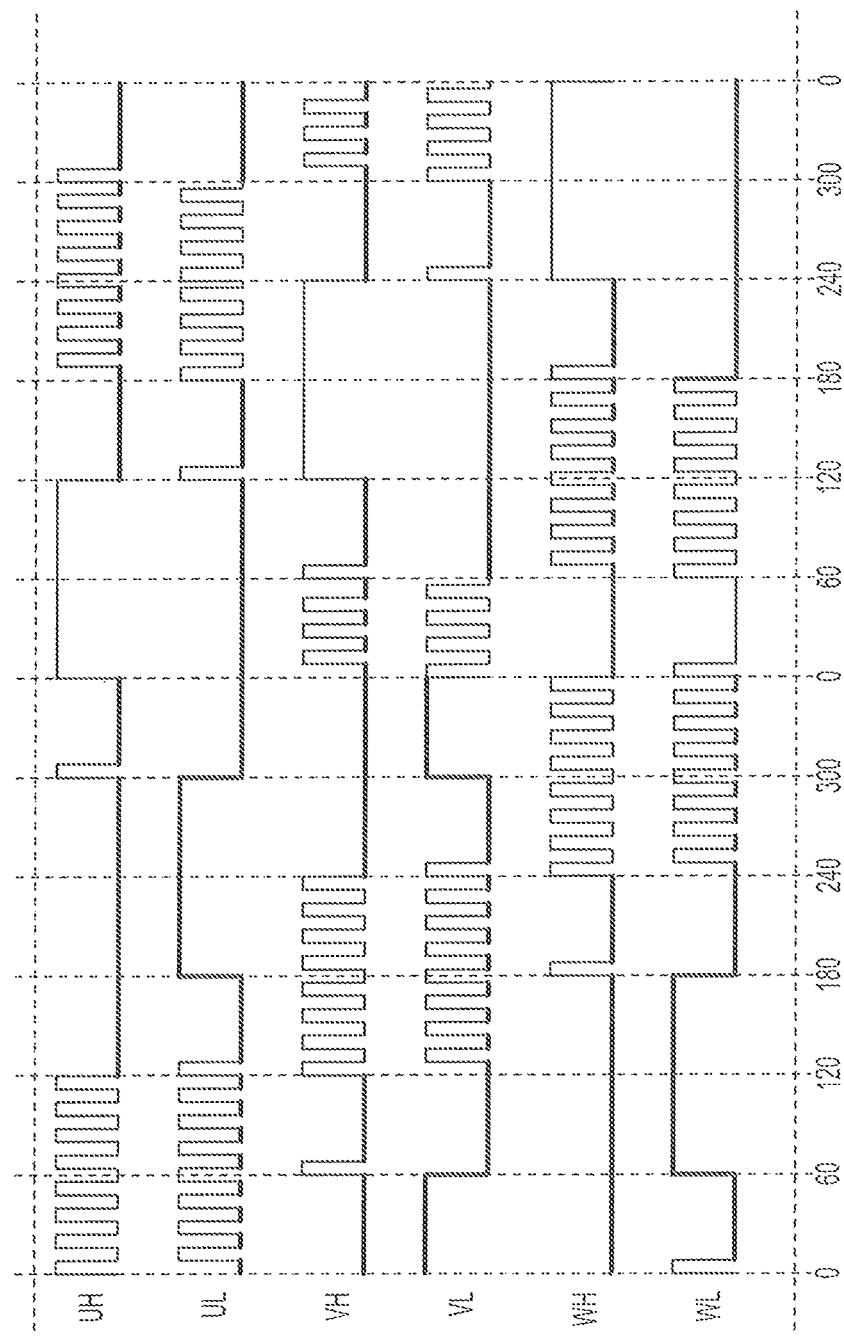
FIG. 5 depicts a waveform diagram of a motor commutation control mechanism according to a second aspect of this disclosure.

Another aspect of this disclosure is discussed herein with reference to FIGS. 5 and 6A-6D, according to an embodiment. As discussed above, during the low-side FET continuous ON cycles, e.g., between 180 to 300 degrees for phase U, the low-side FET is subject to conduction loss as a function of its turn ON resistance. The low-side FETs of the other two phases V and W similarly experience conduction losses during their respective ON cycles. In order to distribute the power conduction losses between the high-side and low-side FETs, according to an embodiment of the invention, an improved switching control scheme is provided as illustrated in the diagram of FIG. 5.

In this embodiment, the continuous ON cycle is distributed between the high and the low-side FETS. During a first full 360 degree cycle, the U phase (for example) is controlled as described above with reference to FIG. 4. In a subsequent second cycle, however, the continuous ON cycle is assigned to the high-side FET. Specifically, in the second full cycle, in an exemplary embodiment, the high-side FET is turned continuously ON while the low-side FET is OFF for the first 120 degrees. Both FETs are then OFF continuously, subject to a small period where an edge pulse is introduced for the low-side FET, between 120-180 degrees. The low-side FET is then used for PWM control, with the high-side FET being controlled for synchronously rectification, between 180 to 300 degrees. Finally, both FETs are OFF, subject to an edge pulse for the high-side FET, between 300-360 degrees. A subsequent third cycle in this embodiment (not shown) will be controlled similarly to the first cycle, and so on. In this manner, the ON cycle and the resulting conduction loss associated therewith is shared between the low-side and high-side FETs.

This helps reduce the overall stress on FETs as high-side and low-side FETs carry equal portion of the loss.

Figure 6A:
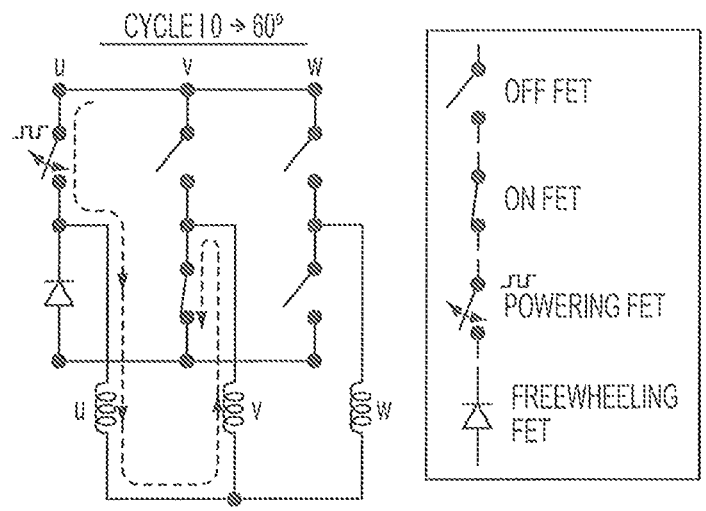
FIGS. 6A-6D depict simplified circuit diagrams showing current paths of various phases of the motor during different cycles of the waveform diagram of FIG. 5.
Figure 6B:
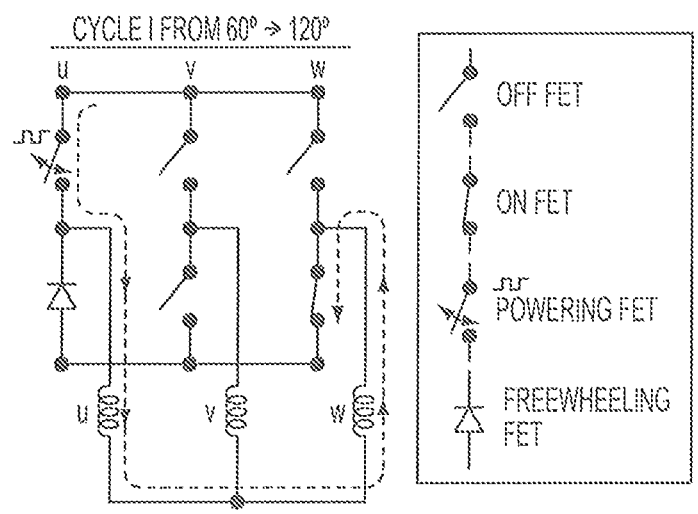
Figure 6C:
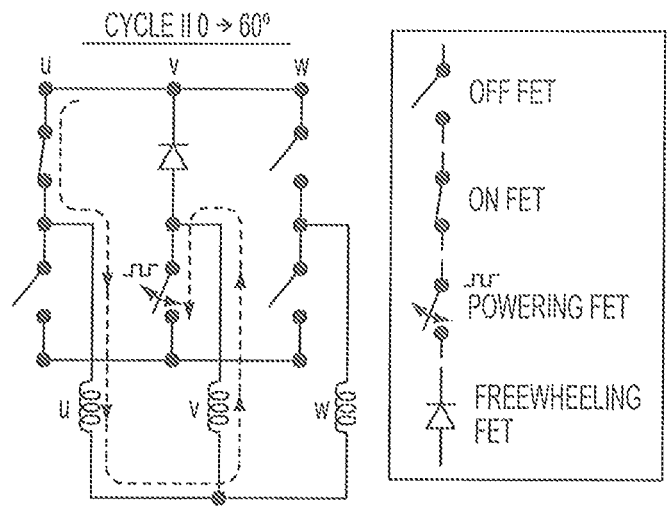
Figure 6D:
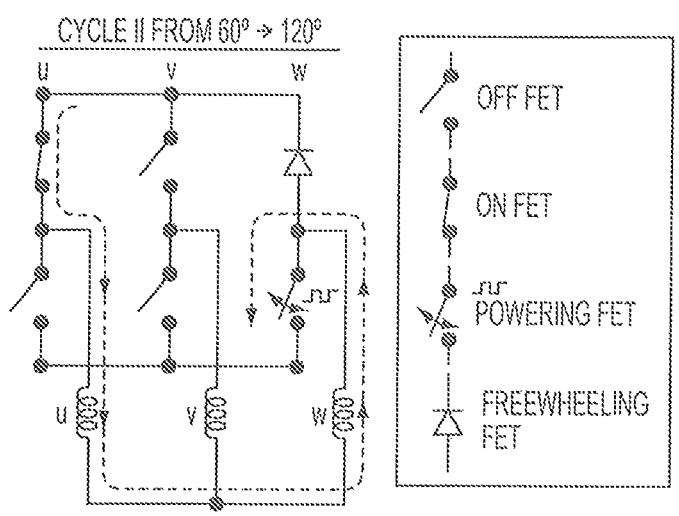

It is noted that the PWM cycle of the V phase is split two 60 degree cycles between 0 to 60 degrees and 300 to 360 degrees in order to accommodate this modification. It is also noted that even though the PWM control in this embodiment is different from one cycle to the next, the current flow through the motor is effectively remains unchanged. FIGS. 6A-6B illustrate the current path through the FETs and the motor windings during the first 120 degrees for of the first cycle, whereas FIGS. 6C and 6D illustrate the current path during the first 120 degrees of the second cycle, according to an exemplary embodiment. As shown In FIGS. 6A and 6B, in the first cycle, the high-side FET of the U phase is used for PWM control and the current path continues through either the V or the W phase low-side FETs. During the second cycle, as shown in FIGS. 6C and 6D, the low-side FETs of the V and W phases are used for PWM control while the current path is carried through the high-side FET of the U phase. The current path of FIG. 6A is identical to the current path of FIG. 6C. Similarly, the current path of FIG. 6B is identical to the current path of FIG. 6D. Accordingly, though a different set of FETs are used for PWM control in the second cycle, the current path remains virtually unchanged.

It will be understood by a person of ordinary skill in the art that while the above-described embodiments and aspects of the disclosure are discussed with reference to a brushless DC motor, the disclosed concepts may be similarly applied to any type of AC or DC, brushed or brushless motor. The description of the disclosure is merely exemplary in nature and, thus, variations that do not depart from the gist of the disclosure are intended to be within the scope of the disclosure. Such variations are not to be regarded as a departure from the scope of the disclosure.

The invention claimed is:

1. A power tool comprising:
a housing;
a brushless direct current (BLDC) motor housed inside the housing, the motor including a stator and a rotor pivotably arranged inside the stator;
a plurality of high-side and low-side switches arranged between a power source and the motor and configured as a three-phase bridge to commutate the motor, each phase of the bridge being connected to a corresponding phase of the stator;
a control unit configured to provide drive signals to drive each of the high-side and low-side switches to control, for each phase of the bridge, a pulse-width modulation (PWM) of one of the high-side or low-side switches, and immediately following a first cycle ending with a falling edge of the drive signal for one of the high-side or low-side switches, to introduce a special commutation edge pulse in the drive signal of the other of the high-side or low-side switches to shunt the current from the motor before turning both the high-side and the low-side switches off during a second cycle.

2. The power tool of claim 1, wherein for each phase of the bridge, the control unit is configured to control the PWM of the high-side switch and synchronous rectification of the low-side switch during the first cycle.

3. The power tool of claim 2, wherein the control unit is configured to introduce the special commutation edge pulse in the drive signal for the low-side switch during the second cycle.

4. The power tool of claim 1, wherein for each phase of the bridge, the control unit is configured to keep the high-side switch OFF and the low-side switch ON during the first cycle.

5. The power tool of claim 4, where the control unit is configured to introduce the special commutation edge pulse in the drive signal for the high-side switch during the second cycle.

6. The power tool of claim 1, wherein the control unit is configured to determine a width of the special commutation edge pulse as a function of either a peak current or a resistance and inductance of the current flow path.

7. The power tool of claim 1, wherein the plurality of high-side and low-side switches comprise MOSFETs.

8. A method of controlling a commutation of a brushless direct current (BLDC) motor via a plurality of high-side and low-side switches arranged between a power source and the motor and configured as a three-phase bridge, the method comprising:
providing drive signals to drive each of the high-side and low-side switches to control a pulse-width modulation (PWM) of one of the high-side or low-side switches for each phase of the bridge; and
immediately following a first cycle ending with a falling edge of the drive signal for one of the high-side or low-side switches within each phase of the bridge, introducing a special commutation edge pulse in the drive signal of the other of the high-side or low-side switches to shunt the current from the motor before turning both the high-side and the low-side switches off during a second cycle.

9. The method of claim 8, comprising, for each phase of the bridge, controlling the PWM of the high-side switch and synchronous rectification of the low-side switch during the first cycle.

10. The method of claim 9, comprising introducing the special commutation edge pulse in the drive signal for the low-side switch during the second cycle.

11. The method of claim 8, comprising, for each phase of the bridge, keeping the high-side switch OFF and the low-side switch ON during the first cycle.

12. The method of claim 11, comprising introducing the special commutation edge pulse in the drive signal for the high-side switch during the second cycle.

13. The method of claim 8, comprising determining a width of the special commutation edge pulse as a function of either a peak current or a resistance and inductance of the current flow path.

14. A power tool comprising:
a housing;
a brushless direct current (BLDC) motor housed inside the housing, the motor including a stator and a rotor pivotably arranged inside the stator;
a plurality of high-side and low-side switches arranged between a power source and the motor and configured as a three-phase bridge to commutate the motor, each phase of the bridge being connected to a corresponding phase of the stator;
a control unit configured to provide drive signals to drive each of the high-side and low-side switches to control, for at least one phase of the bridge, a pulse-width modulation (PWM) cycle of the high-side switch followed by a continuous ON cycle of the low-side switch during a first full cycle, and a continuous ON cycle of the high-side switch followed by a PWM cycle of the low-side switch during a second full cycle.

15. The power tool of claim 14, wherein the control unit is configured to control a synchronous rectification of the low-side switch during the PWM cycle of the high-side switch, and control a synchronous rectification of the high-side switch during the PWM cycle of the low-side switch.

16. The power tool of claim 14, the PWM cycle of the high-side switch during the first full cycle has the same width as the continuous ON cycle of the high-side switch during the second full cycle.

17. The power tool of claim 14, wherein, for a second phase of the bridge, the controller is configured to control a PWM cycle of the high-side switch during the second full cycle in two separate cycles with a continuous ON-cycle of the high-side switch in between.

18. The power tool of claim 14, wherein the controller is configured to control a continuous-ON cycle of the low-side switch during the first full cycle, but not during the second full-cycle.

19. The power tool of claim 14, wherein the plurality of high-side and low-side switches comprise MOSFETs.

* * * * *